United States Patent

Noguchi et al.

Patent Number: 5,228,812
Date of Patent: Jul. 20, 1993

[54] THROW-AWAY TIPPED DRILL

[75] Inventors: Kazuo Noguchi; Yoshikatsu Mori; Nobuyuki Kitagawa; Toshio Nomura; Kazutaka Isobe, all of Hyogo, Japan

[73] Assignee: Sumitomo Electric Industries, Ltd., Osaka, Japan

[21] Appl. No.: 743,427

[22] PCT Filed: Dec. 21, 1990

[86] PCT No.: PCT/JP90/01670

§ 371 Date: Aug. 22, 1991

§ 102(e) Date: Aug. 22, 1991

[87] PCT Pub. No.: WO90/09698

PCT Pub. Date: Jul. 11, 1991

[30] Foreign Application Priority Data

| Dec. 25, 1989 | [JP] | Japan | 1-337944 |
| Dec. 29, 1989 | [JP] | Japan | 1-339986 |
| Dec. 29, 1989 | [JP] | Japan | 1-339987 |
| Feb. 5, 1990 | [JP] | Japan | 2-26752 |
| Feb. 5, 1990 | [JP] | Japan | 2-26753 |
| Feb. 5, 1990 | [JP] | Japan | 2-26755 |
| Jul. 10, 1990 | [JP] | Japan | 2-183571 |

[51] Int. Cl.⁵ .............................. B23B 51/00
[52] U.S. Cl. .................... 408/144; 407/119; 408/213; 408/713; 408/714
[58] Field of Search ............. 407/119; 408/144, 145, 408/227, 231, 713, 714

[56] References Cited

U.S. PATENT DOCUMENTS

| 4,113,503 | 9/1978 | Lumby et al. | |
| 4,293,253 | 10/1981 | Ott | 408/226 |
| 4,527,931 | 7/1985 | Sarin | 408/713 X |
| 4,744,704 | 5/1988 | Galvefors | 408/144 |

FOREIGN PATENT DOCUMENTS

| 0118806 | 9/1984 | European Pat. Off. | 408/231 |
| 0183965 | 6/1986 | European Pat. Off. | 408/144 |
| 262345 | 6/1912 | Fed. Rep. of Germany . | |
| 41-12144 | 6/1966 | Japan . | |
| 58-143115 | 9/1983 | Japan . | |
| 62-15409 | 1/1987 | Japan . | |
| 62-48408 | 3/1987 | Japan . | |
| 62-94206 | 4/1987 | Japan . | |
| 62-218010 | 9/1987 | Japan . | |
| 62-46489 | 12/1987 | Japan . | |
| 62-292307 | 12/1987 | Japan . | |
| 63-38501 | 2/1988 | Japan . | |
| 63-38502 | 2/1988 | Japan . | |

OTHER PUBLICATIONS

JIS (Japan Industrial Standard) B0171-1609.

Primary Examiner—Steven C. Bishop
Attorney, Agent, or Firm—W. G. Fasse

[57] ABSTRACT

A throw-away tipped drill has an insert removably connected to a shank for cutting a workpiece. The insert (31) and the shank (32) have mutually engaging surfaces respectively, and a slit (34, 39) is formed either in the insert (31) or in the shank (32) for mounting the insert to the shank, whereby the insert (31) is fixed to the shank (32) by an elastic force which is caused by an elastic deformation upon mutual movement of opposite surfaces of this slit (34, 39) in engagement of the insert (31) and the shank (32). Therefore, the insert (31) and the shank (32) are coupled by simple press fitting without any requirement for a screw or other connection, whereby the assembly is improved. The cutting edge of the insert (31) has an excellent wear resistance, adhesion resistance and thermal cracking resistance and the shank (32) has an excellent toughness while the drill is relatively low in costs, by employing surface-coated cemented carbide as the material for the insert while employing steel as the material for the shank.

18 Claims, 6 Drawing Sheets

THROW-AWAY TIPPED DRILL

FIELD OF THE INVENTION

The present invention relates to a drill which is mainly applied to piercing steel, and more particularly, it relates to the structure of and materials for a throw-away tipped drill whose insert portion is separably mechanically connected with a shank portion.

BACKGROUND INFORMATION

A drill is a cutting tool which can be used for piercing steel products and the like. For example, the structure of a twist drill is shown in FIG. 1. The twist drill is formed by a cutting portion 1 which is applied to piercing, and a shank portion 2 which is not concerned in cutting but is mainly used for discharging chips and to be clamped in a chuck on the shaft of a drilling machine.

In general, materials for drills are high-speed steel (rapid tool steel) and cemented carbide. The high-speed steel, which has an excellent toughness but is inferior in its wear resistance, is improper for high-speed cutting. On the other hand, the cemented carbide, which has an excellent wear resistance and accuracy characteristics as a tool but is quite brittle and hence may break when used in a machine tool having low rigidity, for example.

In order to improve drills there has been considered a drill structure with a coating of hard TiN on the cutting portion made of high-speed steel, or a drill structure with a cutting portion made of cemented carbide and brazing the same. There have further been devised different connecting structures e.g. by brazing different materials of cemented carbide (P30 and D30) for improving the wear resistance and toughness, (Japanese Utility Model Laying-Open Gazette No. 58-143115) or a structure of metallurgically attaining an integration or connection (Japanese Utility Model Laying-Open Gazette No. 62-46489), or a structure that takes into account the difference between the characteristics required for a central portion and an outer peripheral portion of a drill and preparing the central portion and the outer peripheral portion from different materials of cemented carbide in a double structure (Japanese Patent Laying-Open Gazette No. 62-218010), or a method of forming such a double structure by injection molding (Japanese Patent Laying-Open Gazette No. 63-38501 or 38502). Further, there is a structure of forming the material for a drill as a cermet, in order to improve adhesion resistance of the drill (Japanese Patent Laying-Open Gazette No. 62-292307).

A cutting portion and a shank portion of a drill are exposed to different loaded conditions in a drilling operation. Therefore, characteristics required for the respective portions of the drill are different from each other. For example, wear resistance, adhesion resistance and the like are required for a cutting edge of the cutting portion, while toughness for maintaining the strength of the tool is required for the shank portion. Further, different cutting edge characteristics are required for different portions along the cutting edge since cutting speeds are different at the center and at the outer peripheral portions of a drill cutting edge.

In a drill whose cutting edge is coated in order to satisfy these different requirements at least a coating layer of a front flank side is inevitably removed when resharpening the drill as is performed in general, whereby most of the coating effect is lost. A drill having such a structure that cemented carbide is brazed to its cutting portion cannot be used for deep hole drilling of a hard to cut material since brazing itself is a method which is essentially inferior in thermal strength and mechanical strength. Further, when cemented carbide is brought into a coarse grain state or a high binder phase state in order to improve the toughness of the shank portion of a drill, the strength of the material is reduced or the elastic limit of distortion is reduced, and hence the shank portion is undesirably broken during drilling, due to vibration of a workpiece, unstable rotation of a drive shaft and the like. Also, the cost of a drill having a large diameter and a long length for drilling deep holes, depends on the drill structure. Drills entirely made of cemented carbide are problematically high-priced both in alloy costs and processing costs.

In order to solve the aforementioned problems, there has recently been devised the so-called throw-away tipped drill, whose cutting portion and shank portion are separately manufactured and mechanically connected to be separable from each other, thereby enabling the use of materials having the characteristics required for the respective drill portions.

Conventional throw-away tipped drills include those shown in FIGS. 2 to 5, for example. FIGS. 2 to 4 show a two-flute throw-away tipped drill, wherein the tips 11a and 11b are fixed to the outer peripheral portion and the inner peripheral portion of a forward end of a shank portion 12 by respective screw connections. On the other hand, FIG. 5 shows a typical example of a one-flute throw-away tipped drill, wherein a cutting portion 21 is fitted in a shank portion 22 as shown by an arrow, and fixed to a screw hole 24 by a screw 23. A coolant is directly supplied from a coolant supply hole 25 to the cutting edge of the cutting portion 21. A chip breaker 26 for chip parting control is formed on the cutting edge of the cutting portion 21.

As another type of a one-flute throw-away tipped drill, there is a spade drill which is defined in JIS B0171-1609. The spade drill is common to each of the aforementioned throw-away tipped drills in that a plate-type cutting portion is fixed to the forward end of a shank portion by screwing.

The aforementioned conventional throw-away tipped drills, whose cutting portions and shank portions are formed of different members, can solve the various problems of the integral drill whose cutting portion is integrated with and made of the same material as its shank portion and of the brazed drill formed by brazing cemented carbide to its cutting portion.

However, each of these throw-away tipped drills, whose cutting portions and shank portions are connected with each other by screwing, causes the following problems:

(1) When the screw hole is increased in size, the tip strength is reduced.

(2) In order to reduce the size of the screw hole, it is necessary to use a small screw, and hence an allowable load for the screw is reduced to inevitably lower the strength of the connection between the cutting portion and the shank portion.

(3) Further, a small screw is inferior in its workability in assembling. In the conventional throw-away tipped drill, consequently, the cutting portion and the shank portion have been easily broken during drilling operations due to insufficiency in strength of the cutting portion and insufficiency in the connection strength between the cutting portion and the shank portion in the case of a small-diameter drill of not more than 20 mm in diameter.

OBJECTS OF THE INVENTION

In consideration of the aforementioned problems of the prior art, a first object of the present invention is to provide a throw-away tipped drill whose insert portion and shank portion can be fastened to each other without any screwing connection.

A second object of the present invention is to provide a throw-away tipped drill which has an excellent wear resistance and adhesion resistance in an insert portion of the drill with a shank portion having sufficient toughness and breakage resistance. Drills of the invention shall not require any resharpening for continuous use.

SUMMARY OF THE INVENTION

The following first four embodiments of the invention comprise features for attaining the aforementioned first object, while the next three embodiments comprise features for attaining the aforementioned second object.

The first embodiment of a throw-away tipped drill according to the invention comprises an insert portion for cutting a workpiece and a shank portion to be connected to a drive shaft of a cutting machine, and the insert portion is separably mechanically connected with the shank portion. Further, the insert portion and the shank portion have mutually engaging portions forming the connection between the insert and the shank, and a slit formed in at least in either the insert portion or the shank portion so that opposite surfaces of such a slit mutually move for an elastic deformation when surfaces of the engaging portions engage each other, whereby the insert portion is fixed to the shank portion by an elastic force.

According to the invention, the insert portion and the shank portion are connected with each other using an elastic force which is caused by an elastic deformation upon mutual movement of the opposite surfaces of the slit in an engaging state of both portions, whereby the insert portion can be connected with or fixed to the shank portion by simply press-fitting the insert portion into the shank portion without employing any fastening component such as a screw.

The second embodiment of a throw-away tipped drill according to the invention comprises an insert portion for cutting a workpiece and a shank portion to be connected to a drive shaft of a cutting machine, and the insert portion is separably mechanically connected with the shank portion. Further, the insert portion and the shank portion have mutually engaging portions for forming a connection between insert and shank. The mutually engaging portions are formed by a held portion of the insert, and holding portions of the shank for holding the held surfaces which are provided on left and right sides of the held portion. The feature of this embodiment of the invention resides in the fact that both or either one of the held surfaces of the insert and opposite holding surfaces of the shank are tapered and the angle of such tapering is so formed that the holding surfaces and the held surfaces come into surface contact with each other and enter a press-fitted state that holds the insert in the shank.

According to this invention, an elastic force caused by an elastic deformation of the holding portions or the held portion acts on the overall engaging surfaces in the engaging state. As a result, a frictional force is caused by a wedging action between the engaging surfaces, so that the insert is fixed to the shank. Therefore, it is possible to assemble the drill by simply pressing the held portion of the insert into the holding portions of the shank with no requirement for other fastening means such as screws.

The third embodiment of the invention relates to a shank for a throw-away tipped drill. The present shank for a throw-away tipped drill is separably mechanically connected with an insert for cutting a workpiece. The shank is connectable to a drive shaft of a cutting machine, and has holding portions for mutually engaging and holding the insert. The feature of this third embodiment of the invention resides in the fact that slits are provided in the holding portions to connect or fix the insert to the shank by holding a held portion of the insert with an elastic force which is caused by an elastic deformation upon mutual movement of opposite surfaces of these slits when the insert engages the shank, whereby the insert can be connected with or fixed to the shank by simply press-fitting the insert into the shank without employing any fastening component such as a screw.

The fourth embodiment of the invention relates to an insert tip for a throw-away tipped drill, wherein the insert tip is separably mechanically connected with a shank portion to be connected to a drive shaft of a cutting machine, for cutting a workpiece. The feature of this insert tip resides in that it has a held portion which mutually engages with the shank portion, and a slit is formed in this held portion so that the tip is connected with or fixed to the shank portion by an elastic force which is caused by an elastic deformation upon mutual movement of opposite surfaces of this slit when the insert engages the shank, whereby the insert tip can be connected with or fixed to the shank portion by simply press-fitting the insert tip into the shank portion without using any fastening component such as a screw.

The fifth embodiment of the invention relates to a throw-away tipped drill with an insert for cutting a workpiece and a shank portion to be connected to a drive shaft of a cutting machine, wherein the insert portion is separably mechanically connected with the shank portion. The feature of this invention resides in that its insert portion is made of surface-coated cemented carbide or cemented carbide, and the shank portion is formed of steel.

When surface-coated cemented carbide is employed as the material for making the insert, the surface coating material is preferably made of one or more materials selected from carbides, nitrides, borides, carbo-nitrides, carbo-oxides, carbo-oxy-nitrides and boronitrides of metals belonging to the groups IVa, Va and VIa of the periodic table such as $Al_2O_3$, TiC, TiN, TiCN, TiAlN and the like. This surface coat may be formed not only in a single layer but also in a plurality of layers. Alternatively, the surface coat may be provided in mixed multiple layers obtained by forming a plurality of coating layers in which at least two of the aforementioned materials are mixed.

It is possible to use any surface treatment method of the so-called physical vapor deposition and chemical vapor deposition as a method of surface-coating the cemented carbide.

The cemented carbide serving as the base material for the insert portion is preferably formed by a hard phase which is made of a B1 type solid solution consisting of WC and one or more types of carbides, nitrides and carbo-nitrides of metals belonging to the groups IVa, Va and VIa of the periodic table, and a binder phase which is made of an iron family metal mainly composed of 5 to 30 percent by volume of Co.

A drill type shown in FIGS. 2 to 4 and a drill type shown in FIG. 5, and the so-called self-grip type throw-away tipped drill having the structure shown in the aforementioned first or second embodiment of the invention can be used as a system of connecting the insert portion and the shank portion of the throw-away tipped drill according to this invention.

Characteristics required for a drill are roughly classified into wear resistance and adhesion resistance of an insert portion and breakage resistance, represented by toughness, of a shank portion. In this invention, the heat resistance and hardness are improved by employing cemented carbide as the material for the insert portion. Thus, high-speed cutting is enabled, and wear resistance and adhesion resistance are improved as compared with a drill made of high-speed steel, so-called rapid tool steel. In addition, the wear resistance and adhesion resistance are further improved by coating the surface of the insert portion which is made of cemented carbide.

Further, since steel is employed as the material for the shank portion, the present drills have an excellent toughness and a good breakage resistance. Yet, it is possible to reduce the material cost.

The sixth embodiment of the throw-away tipped drill according to the invention also comprises an insert portion and a shank portion, and the insert portion is separably mechanically connected with the shank portion. The feature of this invention resides in the fact that its insert is made of a silicon nitride sintered body, and the shank portion is formed of steel.

As to the silicon nitride sintered body for the insert portion, a crystal phase of $Si_3N_4$ or SIALON ($Si_{6\text{ to }z}$ $Al_zN_{8-z}$ wherein z=0 to 4.2) preferably occupies at least 80 percent by weight of the sintered body. More preferably, the silicon nitride sintered body contains 5 to 20 percent of $Al_2O_3$, $Y_2O_3$, MgO and an oxide of a rare earth metal, by weight. These concentrations are desirable because strength is reduced due to reduction of density if the oxide content is less than 5 percent by weight. On the other, the heat resistance, thermal cracking resistance and wear resistance are reduced if the oxide content is in excess of 15 percent by weight.

Further, the surface of the insert portion may be subjected to coating of TiC, TiN, TiCN, TiAlN, $Al_2O_3$ or the like in a single layer or multiple layers.

Similarly to the aforementioned third invention, the system shown in FIGS. 2 to 4, that shown in FIG. 5, and the self-grip system may be used as a connecting device for securing the insert to the shank of the throw-away tipped drill according to this invention.

According to this invention, the heat resistance and wear resistance are substantially increased by utilizing a silicon nitride sintered body as the material for the insert portion, instead of high-speed steel (rapid tool steel) or cemented carbide. Thus, adhesion resistance is also improved.

Further, since steel is used as the material for the shank, the drill has an excellent toughness, a good breakage resistance, and it is possible to reduce the material cost of the drill, similar to the aforementioned fifth invention.

The seventh embodiment of a throw-away tipped drill according to the invention, comprises an insert and a shank. The insert of the throw-away tipped drill according to this invention is made of cermet. This cermet is made of a hard dispersed phase and a metallic binder phase. The hard dispersed phase is mainly composed of titanium and any one of a carbide, a nitride and a double carbo-nitride of at least one of metals belonging to the groups IVa, Va and VIa of the periodic table, excluding titanium. The metallic binder phase is mainly composed of nickel and cobalt. The composition of the hard dispersed phase is expressed as $(Ti_aM_b)(C_cN_d)$. Symbol M represents at least one of metals belonging to the groups IVa, Va and VIa of the periodic table, excluding Ti. Symbols a, b, c and d show molar fractions. Symbols a, b, c and d are defined in the following relational expressions:

$$a+b=1$$

$$c+d=1$$

$$0.5 \leq a \leq 0.95$$

$$0.1 \leq d \leq 0.7$$

The hard dispersed phase comprises at least a fine grain group and a coarse grain group. The mean particle diameter of the fine grain group is at least 0.2 $\mu$m but not more than 0.6 $\mu$m. The mean particle diameter of the coarse grain group is at least 1 $\mu$m but not more than 3 $\mu$m. The volume ratio of the fine grain group to the aforementioned coarse grain group is at least 0.3 but not more than 3. The ratio of the metallic binder phase contained in the cermet is at least 5 percent by weight but not more than 30 percent by weight.

The shank of the throw-away tipped drill according to this embodiment of the invention is separably mechanically connected with the insert. The shank is made of alloy steel. As to the coupling system for the insert and the shank of the throw-away tipped drill according to this invention, a system which is similar to that of the aforementioned fifth embodiment or sixth embodiment of the invention is applicable.

Reasons for restriction of compositions, particle diameters, etc. in the throw-away tipped drill according to this invention are now described.

When wear of a cutting edge advances due to the adhesion of a workpiece and the drill material, the life of the drill comes to a premature end due to adhesion of chips. According to this invention, the composition and the particle diameter of the hard dispersed phase are restricted in order to improve wear resistance and adhesion resistance. The amount of titanium in a metal atom group which is contained in the hard dispersed phase is restricted within a range of 0.5 to 0.95 in molar fraction. If the amount is less than 0.5, wear resistance and adhesion resistance are reduced. If the amount exceeds 0.95, on the other hand, the sintering property of cermet itself deteriorates. Since affinity with iron is reduced by such a high content of titanium, the machined surface of a workpiece containing iron has an improved quality.

The rate of nitrogen in a nonmetal atom group which is contained in the hard dispersed phase is restricted within a range of 0.1 to 0.7 in molar fraction. If the rate is less than 0.1, nitrogen shows no effect of suppressing grain growth of the hard dispersed phase in the sintering of cermet. If the rate exceeds 0.7, on the other hand, the sintering property of cermet deteriorates.

The hard dispersed phase is made of a mixture of a fine grain group having particle diameters of 0.2 to 0.6 $\mu$m, and a coarse grain group having particle diameters of 1 to 3 μm. The volume ratio of the fine grain group to the coarse grain group is restricted within a range of 0.3 to 3. If this volume ratio is less than 0.3, the toughness of cermet deteriorates so that chipping is caused in the cutting edge portion of the drill. If this volume ratio exceeds 3.0, on the other hand, thermal cracking is caused in the cutting edge of the drill.

The amount of the metallic binder phase is restricted to a range of 5 to 30 percent by weight. If the amount is less than 5 percent by weight, toughness of cermet is so insufficient that chipping is caused in the cutting edge of the drill. If the amount exceeds 30 percent by weight, wear resistance is insufficient, resulting in extreme wear being caused in a flank or a margin of the cutting edge.

Alloy steel is employed for the shank of the throw-away tipped drill according to this embodiment of the invention. The alloy steel exhibits excellent toughness against slight impact since its elastic deformation range is wide, and therefore the shank is hard to break. While steel materials are roughly classified into carbon steel, alloy steel and high alloy steel, alloy steel (nickel chrome molybdenum steel, chrome molybdenum steel, tool steel, etc.) is employed in this invention in consideration of both wear resistance and workability. In the case of an insert type one-flute throw-away tipped drill, it is necessary to also consider elasticity material selection and spring steel or the like may also be employed. Further, alloy steel which is generally easier to manufacture is employed for the shank, and sintered hard alloy which requires complicated manufacturing steps is employed only for the insert, thereby reducing the manufacturing cost, and this invention is also cost efficient.

DESCRIPTION OF THE PREFERRED EMBODIMENTS

Figure 6:
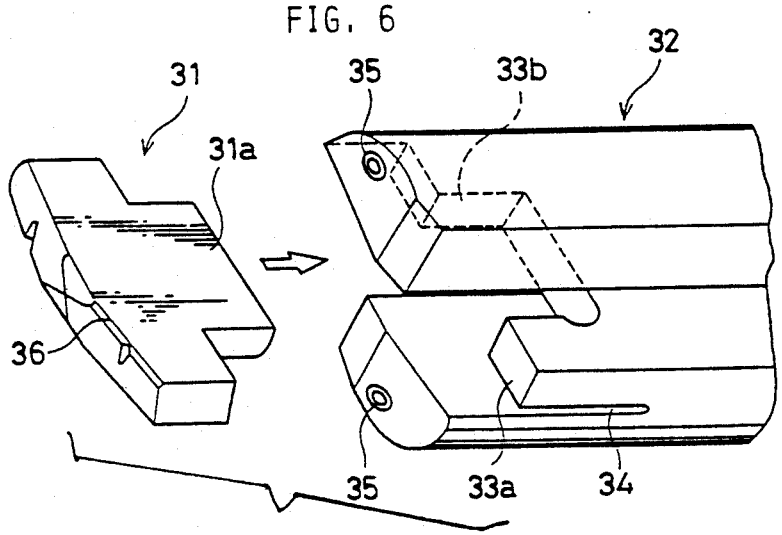
FIG. 6 is an exploded perspective view showing an insert 31 separated from a shank 32 of a throw-away tipped drill with the insert holding portions in the shank and insert, in accordance with an embodiment of the present invention.
Figure 7:
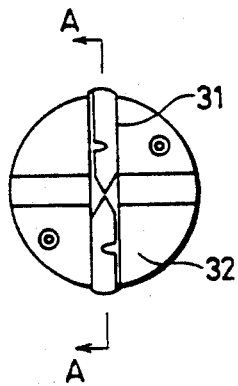
FIG. 7 is a front elevational view of the embodiment.
Figure 8:
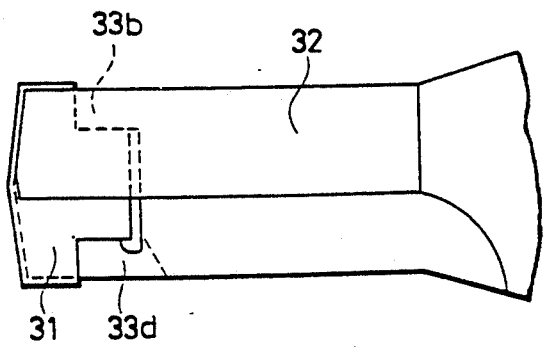
FIG. 8 is a right side elevational view thereof.
Figure 9:
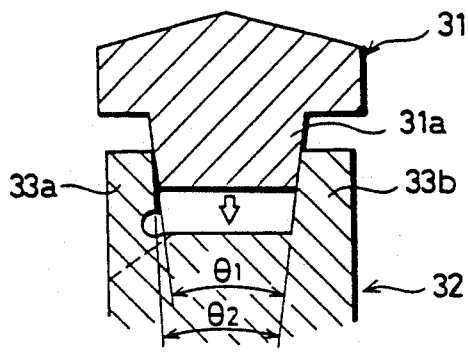
FIG. 9 is a sectional view taken along the line A—A in FIG. 7, showing a state at a point of time for starting press fitting of the insert 31 into the shank in the embodiment shown in FIG. 6.
Figure 10:
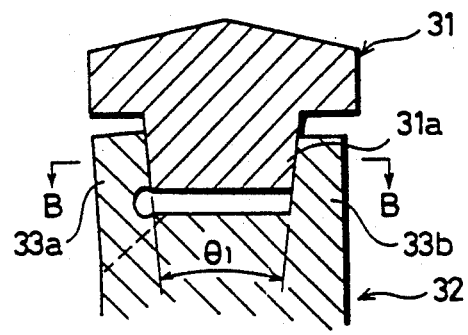
FIG. 10 is the same sectional view showing such a state that the insert 31 is connected with or fixed to the shank 32 as shown in FIG. 9.

An embodiment of the first invention is now described on the basis of FIGS. 6 to 10. Referring to FIG. 6, the throw-away tipped drill of this embodiment employs the so-called self-grip system, in which an insert 31 is fitted into a shank 32 along the direction shown by an arrow in FIG. 6, so that the insert 31 and the shank 32 are connected without using a screw etc. In this embodiment, a state in which the insert 31 and the shank 32 are connected is as shown in FIGS. 7 and 8. In this connected state, the insert 31 is fixed to the shank 32 by frictional force which is caused by the side portions of a held portion 31a of the insert 31 coming in contact with inner end surfaces of holding portions 33a and 33b of the shank 32. With reference to FIGS. 9 and 10, the state of connection attained by engagement of the insert 31 and the shank 32 in this embodiment is explained as follows: In a state before engagement of the insert 31 and the shank 32, an angle $\theta_1$ formed between left and right side portions of the held portion 31a is slightly larger than an angle $\theta_2$ formed between opposite inner end surfaces of the holding portions 33a and 33b, as shown in FIG. 9. When the insert 31 is press-fit into the shank 32, the angle $\theta_2$ is gradually expanded by a wedge action due to tapering of the left and right side portions of the held portion 31a and formation of a slit 34 on the side of the holding portion 33a. While the angles are in a relation $\theta_1 > \theta_2$, the held portion 31a and the holding portion 33a are in contact with each other only on an upper end of the inner side surface of the holding portion 33a. When $\theta_2$ coincides with $\theta_1$, the contact areas between both side portions of the held portion 31a and the inner end surface of the holding portion 33a are maximized as shown in FIG. 10. The press fitting is stopped in this state, so that pressing force is caused in the contact surface with the held portion 31a by elastic force resulting from elastic deformation of the holding portion 33a. The insert 31 is connected with or fixed to the shank 32 by frictional force between the contact surfaces.

A coolant is directly supplied to the cutting edge of the insert 31 from a coolant supply hole 35. A chip breaker 36 for parting chips is formed on the cutting edge of the insert 31.

The angle $\theta_1$ formed by the left and right side portions of the held portion 31a is set at an angle of 4° to 20°, preferably 8° to 15°. The reason for such setting of the range of the value of the $\theta_1$ is as follows: First, if $\theta_1$ is reduced, positioning accuracy of the insert 31 in the connected state shown in FIG. 10 is substantially influenced by the dimensional accuracy of 1, the held portion 31a and the holding portions 33a and 33b. If $\theta_1 < 4°$, it is rather very difficult to implement dimensional accuracy of the held portion 31a and the holding portions 33a and 33b for attaining desired positioning accuracy of the insert 31. If $\theta_1$ is increased, on the other hand, a component of pressing force, which is applied to the held portion 31a from the holding portions 33a and 33b, along the axial direction of the shank 32 is increased. Since this force acts in such a direction that the insert 31 is disengaged against frictional force, the force for fixing the insert 31 is weakened as $\theta_1$ is increased. It has been confirmed that desired fixing force for the insert 31 with respect to the shank 32 cannot be obtained when $\theta_1$ exceeds 20°.

Figure 11:
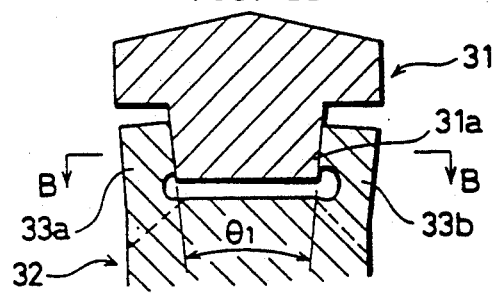
FIG. 11 is a sectional view showing the embodiment of the present invention, in which slits 34 are provided on both sides of holding portions 33a and 33b.

As another embodiment of the shank 32, slits 34 may be formed not only on the side of the held portion 33a but also on the side of the holding portion 33b, as shown in FIG. 11. In this case, both of the holding portions 33a and 33b are flared as the insert 31 is press-fitted into the shank 32, so that the held portion 31a is held by the elastic force. Also in this case, the value of $\theta_1$ is set at 4° to 20°, similar to the aforementioned value of $\theta_1$.

Figure 12:
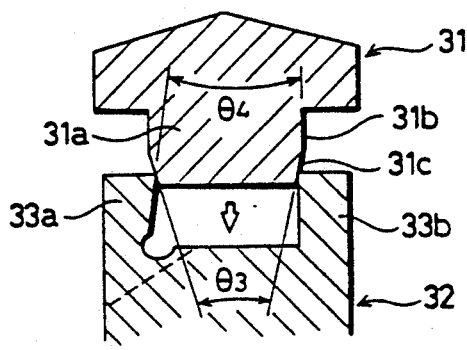
FIG. 12 is a sectional view showing a state at a point of time for starting press fitting of an insert 31 into a shank 32 in another embodiment of the present invention.
Figure 13:
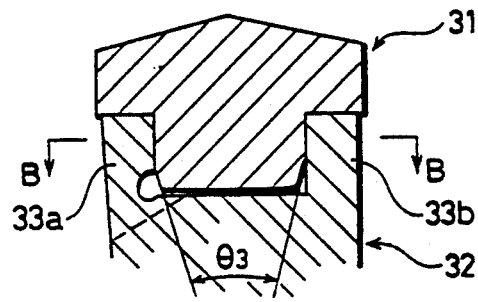
FIG. 13 is a sectional view showing a connected or fixed state as shown in FIG. 12.

Still another embodiment as to the configurations of the held portion 31a and the holding portions 33a and 33b is shown in FIGS. 12 and 13. In this embodiment, a side portion of the held portion 31a of the insert 31 is formed by a tapered portion 31c which forms an angle 83 with a parallel portion 33b, as shown in FIG. 12. Further, the inner end surfaces of the holding portions 33a and 33b of the shank 32 have tapering (angle $\theta_4$) which is inverse to the tapering (angle $\theta_1$) of the held portion shown in FIG. 9 etc. As the insert 31 is press-fit along the arrow direction shown in FIG. 12, opposite surfaces of slits 34 relatively move and the held portion 33a is flared by a wedge action of the tapered portion 31c, and when the press fitting is further performed, the insert is fixed in the state shown in FIG. 13, i.e., such that the upper end surface of the holding portions 33a and 33b are in contact with left and right lower end surfaces of the insert 31. $\theta_3$ and $\theta_4$ are so selected that the inner end surfaces of the holding portions 33a and 33b are parallel to each other and contact areas with the side portions of the held portion 31a are maximized in this state. Also since the inner end surfaces of the holding portions 33a and 33b of the shank 32 are parallel to each other, it is possible to attain sufficient holding power although the contact areas are reduced. Also in this embodiment, the held portion 31a is held by elastic force following elastic deformation of the holding portion 33a having the slit 34 similar to the embodiment of FIG. 9, and the insert 31 is connected with or fixed to the shank 32 by frictional force. According to this embodiment, the upper end surfaces of the holding portions 33a and 33b come into contact with the insert 31 in the connected state of the insert 31 and the shank 32, whereby the insert 31 is further reliably positioned with respect to the shank 32 as compared with the aforementioned respective embodiments.

Figure 3:
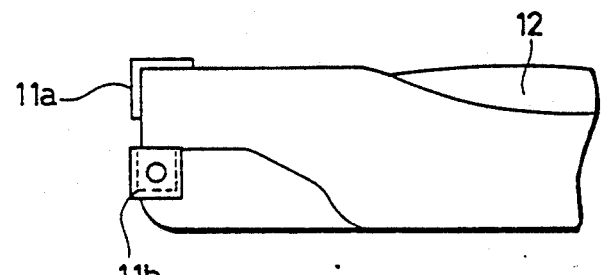
FIG. 3 is a right side elevational view of FIG. 2.
Figure 5:
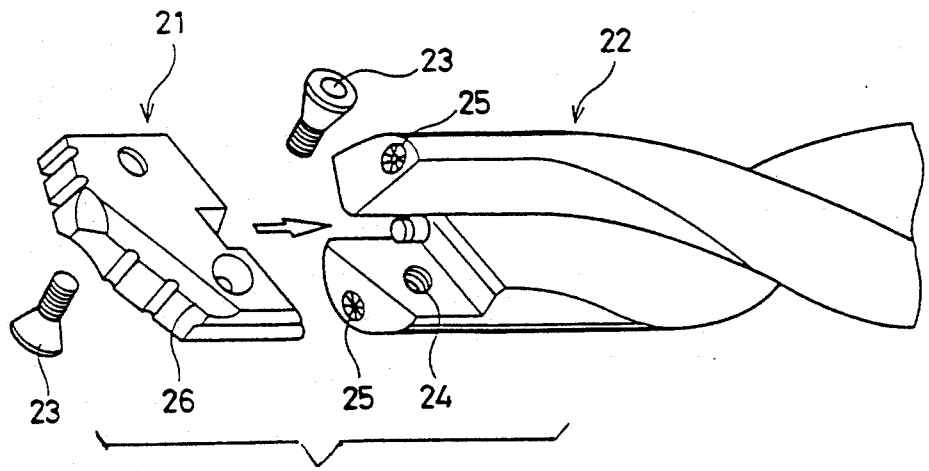
FIG. 5 is an exploded perspective view of a conventional one-flute screwed type throw-away tipped drill.
Figure 14:
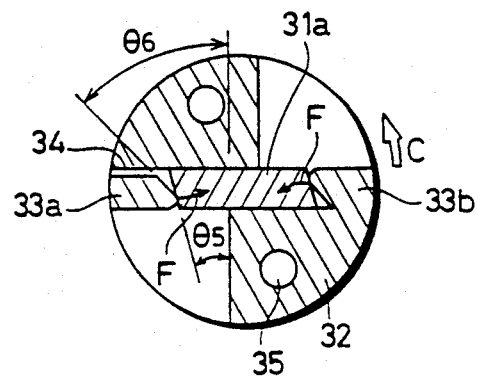
FIG. 14 is a sectional view taken along the line B—B in FIG. 10 or FIG. 13.

Each B—B section of the embodiments shown in FIGS. 10 and 13 is as shown in FIG. 14. In this embodiment, the cross-section of the held portion 31a of the insert 31 is in the form of a parallelogram, and both of the inner end surfaces of the holding portions 33a and 33b are inclined. The inclination angle ($\theta_6$ shown in FIG. 14) of the inner end surfaces of the holding portions 33a and 33b is larger than the inclination angle ($\theta_5$ shown in FIG. 14) of the side portions of the held portion 31a. In the state shown in FIG. 3B or FIG. 5B, therefore, force F in a direction shown in FIG. 14 acts substantially in line contact with the side portion of the held portion 31a in the vicinity of one edge of the inner surface of each of the holding portions 33a and 33b. This force F acts in a direction for pressing the end surface of the held portion 31a against the inner wall surface of the shank 32, whereby the insert 31 and the shank 32 are still further reliable connected with or fixed to each other. Further, since the drill rotates in a arrow C direction shown in FIG. 14, torque which acts on the insert 31 during perforating by the drill also acts in the direction for pressing the end portion of the held portion 31a against the inner wall surface of the shank 32.

Figure 15:
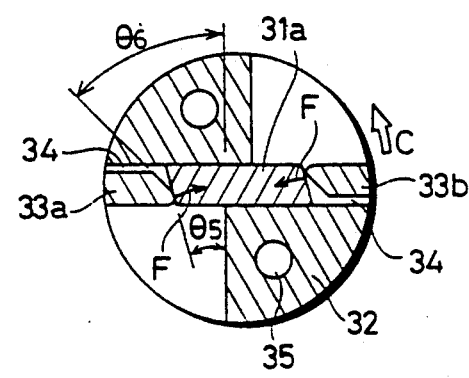
FIG. 15 is a sectional view taken along the line B—B in FIG. 11.
Figure 16:
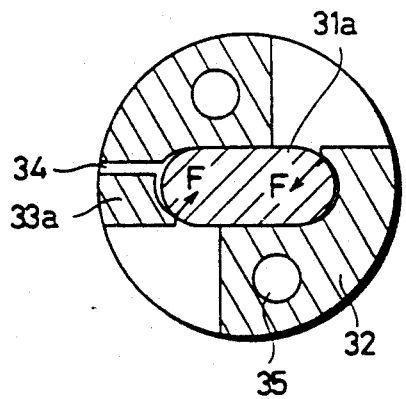
FIG. 16 is a sectional view of the section taken along the line B—B in FIG. 10 or FIG. 13.

The B—B section of the embodiment shown in FIG. 11 is as shown in FIG. 15, and relations between inclination angles $\theta_5$ and $\theta_6$, force F, and a rotational direction C are similar to those shown in FIG. 14, except that the slit 34 is also formed on the side of the held portion 33b.

Figure 17:
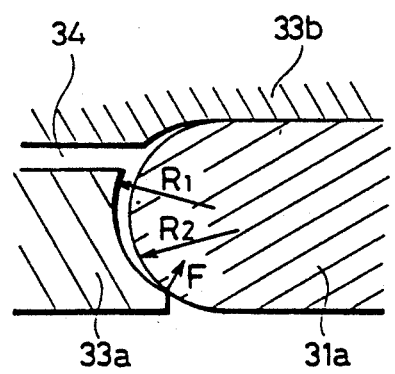
FIG. 17 is a partially enlarged sectional view of line B—B in FIGS. 10 or 13.

Alternatively, means for generating the force F may be implemented by making both side portions of the held portion and the inner end surfaces of the holding portions in configurations of cylindrical surfaces and changing the radii of curvature thereof while making the central positions thereof eccentric, in place of making the cross-section of the held portion 31a in the form of a parallelogram as in the aforementioned embodiment. Namely, as shown in FIG. 17 in an enlarged manner, the radius $R_1$ of curvature of the holding surfaces and the radius $R_2$ of curvature of the held surfaces are so set that $R_1 < R_2$ and the centers thereof are slightly displaced, whereby holding portions 33a and 33b and held portions 31a and 31b are brought into line contact states and force F acts similarly to the embodiments shown in FIGS. 14 and 15, so that a similar function or effect can be attained.

Figure 18:
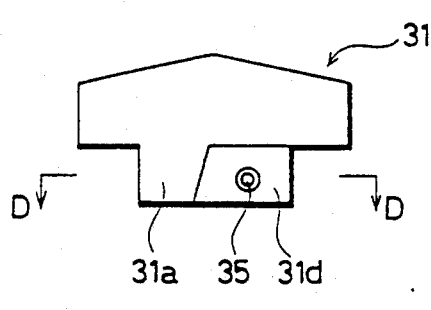
FIG. 18 is a diagram showing an embodiment of an insert comprising displacement preventive means for joints of an insert 31 and a shank 32.
Figure 19:
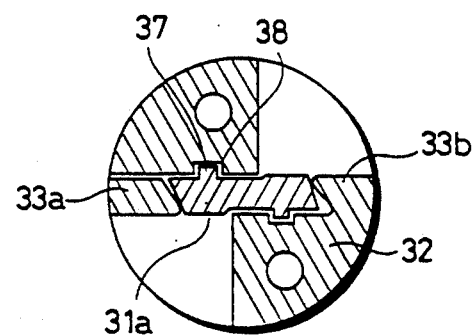
FIG. 19 is a sectional view taken along the line D—D in FIG. 18, showing such a state that the insert 31 of the embodiment engages with the shank 32.
Figure 20:
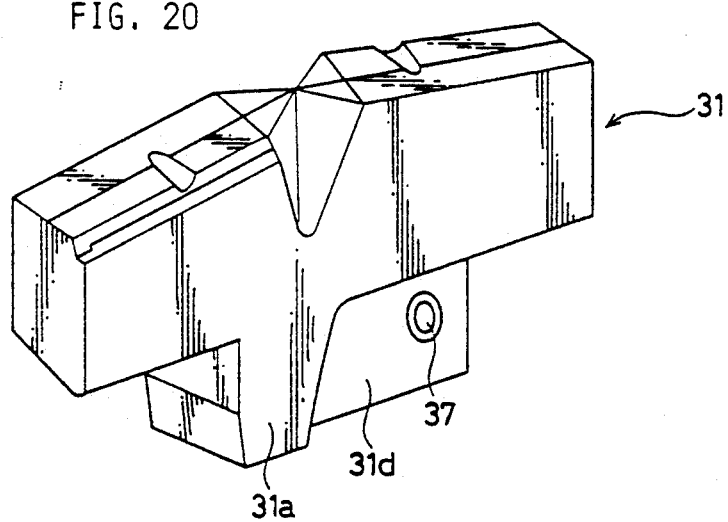
FIG. 20 is a perspective view showing the insert 31 shown in FIG. 18.

FIGS. 18 to 20 show still another embodiment of this invention. In this embodiment, depressed portions 31d are formed on front and back end surfaces of a held portion 31a of an insert 31, and projections 37 are provided at substantially central portions thereof. These projections 37 engage with recessed portions 38 which are provided on inner walls of a shank 32 in such a manner that the insert 31 is connected with the shank 32. Thus, the insert 31 is stopped in the shank 32 in the position of the connected state, and prevented from disengagement.

Figure 21:
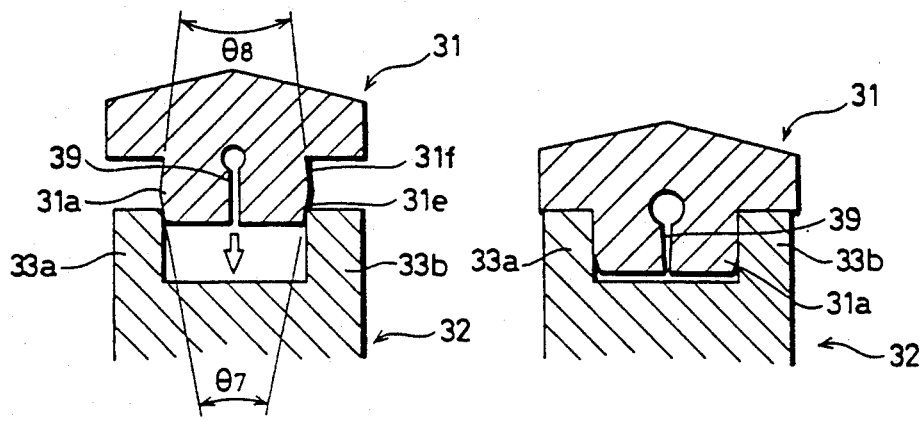
FIG. 21 is a sectional view showing a state at a point of time for starting press fitting of an insert 31 into a shank 32 in still another embodiment of the present invention.
Figure 22:
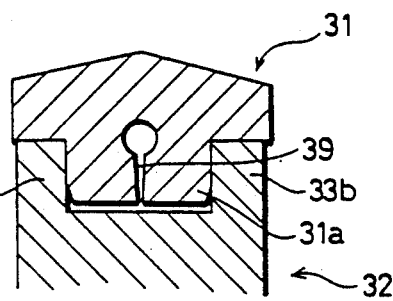
FIG. 22 is a sectional view showing means by which the insert 31 and the shank 32 are connected with or fixed to each other.

Although the slits 34 are provided on the holding portion sides of the shank 32 as means for generating elastic force for connecting or fixing the insert 31 and the shank 32 with or to each other in each of the aforementioned embodiments, a substantially similar function or effect can be attained also by providing a slit 39 on an insert 31 side, as shown in FIGS. 21 and 22. In this case, a lower tapered portion 31e and an upper tapered portion 31f of a side portion of a held portion 31a form angles $\theta_7$ and $\theta_8$ as shown in FIG. 21 respectively. When the insert 31 is press-fit into a shank 32 along the arrow direction, the held portion 31a is first held by holding portions 33a and 33b by inclination of the lower tapered portion 31e, and fixed in the state shown in FIG. 22. At this time, a clearance of the slit 39 is so narrowed that the upper tapered portion 31b is substantially parallel to maximize contact areas with the inner end surfaces of the holding portions 33a and 33b, whereby the insert 31 and the shank 32 are connected with or fixed to each other by pressing force and frictional force following elastic deformation of the held portion 31a.

In any case of connection or fixing in the aforementioned respective embodiments, it is possible to replace the insert by easily removing the insert 31 from the shank 32 using a jig.

While both the insert 31 and the shank 32 of each of the aforementioned embodiments are somewhat complicated in configuration, substantially final required configurations are relatively easily manufactured in a molding stage when an injection molding technique is employed.

EMBODIMENTS OF SECOND INVENTION

All embodiments of the second invention are common to the aforementioned embodiments of the first invention, and are explained similarly to the aforementioned embodiments of the first invention, on the basis of FIGS. 6 to 22.

EMBODIMENTS OF THIRD INVENTION

As to the third invention, the shank 32 in FIGS. 6 to 17, which have been explained as the embodiments of the aforementioned first invention, correspond to embodiments thereof. Therefore, the embodiments of this invention are explained similarly to the aforementioned embodiments of the first invention, using these figures.

EMBODIMENTS OF FOURTH INVENTION

As to the fourth invention, the insert 31 shown in FIGS. 21 and 22, which has been explained as the embodiment of the aforementioned first invention, corresponds to its embodiment. Therefore, the embodiment of this invention is explained similarly to the aforementioned embodiment of the first invention, using these figures.

EMBODIMENTS OF FIFTH INVENTION

Embodiments of the fifth invention are now described.

First Embodiment

A throw-away tipped drill in a first embodiment of this invention is formed by employing surface-coated cemented carbide for an insert portion while employing steel for a shank portion, and mechanically connecting both portions to be separable in the system shown in FIG. 6.

Surface-coated cemented carbide materials forming the insert portions in this embodiment are prepared by mixing various types of powder materials so that compositions of hard phases and binder phases reach numerical values shown in Table 1 after sintering. As to steel materials forming the shank portions, those shown in Table 1 are employed. Inventive samples and comparative samples of this embodiment, shown in Table 1, are those whose insert portions and shank portions are connected in the system shown in FIG. 6. Among the inventive samples A to D, the sample D, which is in the scope of this invention for the time being, is an example of such a case that the volume percentage of the binder phase, shown with **, is considerably less than a preferably value. As to the comparative sample E, the insert portion is made of cemented carbide but not surface-coated. As to the comparative sample F, K30-grade cemented carbide, which is out of the scope of this invention, is employed as the material for the shank portion. Numerals which are out of the scope of this invention are shown with marks * respectively.

TABLE 1

| | Insert Portion | | | |
|---|---|---|---|---|
| Sample | Composition of Binder Phase (mol ratio) | Binder Phase (vol. %) | Surface Coating Material | Shank Portion |
| Inventive Sample | | | | |
| A | WC:(TiTa)(CN) = 7:3 | 13 | TiN | SCM435 |
| B | WC:(TiTa)(CN) = 7:3 | 13 | Al$_2$O$_3$ | SKS2 |
| C | WC:(TiW)C = 5:5 | 18 | TiCN | SNCM420 |
| D | WC:(TiTa)(CN) = 7:3 | **3 | TiN | SCM435 |
| Comparative Sample | | | | |
| E | WC:(TiTa)(CN) = 7:3 | 13 | *None | SCM435 |
| F | WC:(TiTa)(CN) = 7:3 | 13 | TiC + Al$_2$O$_3$ | *K30-Grade Cemented Carbide (WC-11 wt. % Co) |

Performance evaluation tests of drills were carried out using drills of 18 mm diameter under the following conditions:

Workpiece: S50C (H$_B$=230)

Cutting Speed: 100 m/min., wet process (water-soluble cutting oil)

Feed: 0.15 mm/rev.

Depth: 35 mm

Criterion: Conditions of cutting edges etc. are observed after working up to end of life.

Life: Generally regarded as ended when the outer peripheral flank is worn in excess of 0.2 mm.

Results of the aforementioned drill performance evaluation tests are shown in Table 2. An analysis yields excellent results attained from the inventive samples A to C. Sample D of the invention was prone to cutting edge chipping because the binder phase of the cemented carbide forming the insert portion was less than the preferable values of 5 to 30 percent by volume, as shown with ** in Table 1.

Similar experiments were performed on four conventional types of drills for the purpose of reference and are recorded in the lower area of Table 2. Comparing these results to those of the inventive samples A to C reveals the superiority of the inventive samples.

TABLE 2

| Sample | Number of Worked Holes | Amount of Outer Peripheral Front Flank Wear (mm) | Depth of Inner Peripheral Face Adhesive Wear (mm) |
|---|---|---|---|
| Inventive Sample | | | |
| A | 3500 | 0.2 | 0.01 |
| B | 4100 | 0.2 | 0.02 |
| C | 3700 | 0.2 | 0.01 |
| D | 117 | Test stopped by cutting edge chip | |
| Comparative Sample | | | |
| E | 1200 | 0.2 | 0.12 |
| F | 1550 | Test stopped by breakage of shank portion | |
| Reference | | | |
| Cutting Edge: Coated High-Speed Steel | 20 | 0.2 (chipping: 2 portions) | 0.10 |
| Cutting Edge: Alumina | 1800 | Test stopped by cutting edge chip | |
| Integral Coated High-Speed Steel | 40 | Test stopped by cutting edge chipping. | |
| Integral Coated Cemented Carbide | 1990 | Test stopped by breakage of shank portion | |

Second Embodiment

Figure 2:
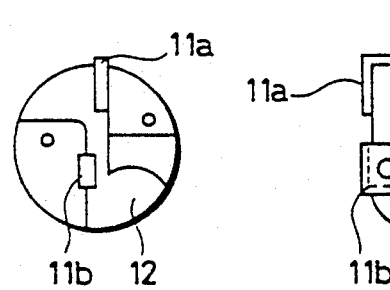
FIG. 2 is a front elevational view showing an example of a conventional two-flute throw-away tipped drill.
Figure 4:
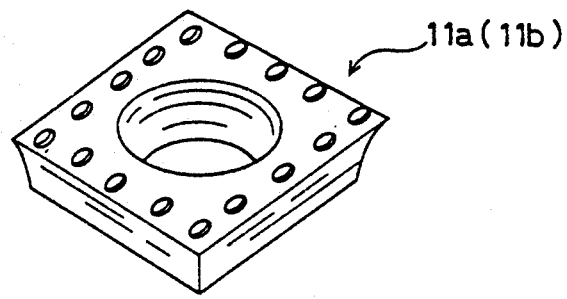
FIG. 4 is a perspective view showing on an enlarged scale, the tip of the drill of FIG. 2.

A second embodiment of this invention is now described. In this embodiment, cutting characteristics were compared in relation to inventive samples of throw-away tipped drills having insert portions and shank portions of the same materials as those of the sample A in the aforementioned first embodiment respectively, as to three types of connection systems, i.e., the self-grip system shown in FIG. 6 (sample G), the two-flute screwed drill shown in FIGS. 2 to 4 (sample H) and the one-flute screwed drill shown in FIG. 5 (sample I), and a brazing-connected drill having a cutting edge of cemented carbide (sample J), which was out of the scope of the present invention. Cutting conditions thereof are as follows:

Workpiece: S50C ($H_B=220$)
Cutting Speed V: 50 m/min., 150 m/min. (water-soluble cutting oil)
Feed: 0.2 mm/rev.
Depth: 40 mm
Diameter of Drilled Hole: 20 mm Table 3 shows the results of evaluated characteristics in this embodiment. The cutting characteristics, represented by stability, can be regarded as displaying excellent cutting characteristics as horizontal components and thrusts of cutting balance acting on the drills by cutting resistance shown in Table 3 are reduced and values of dependency are reduced with respect to the speeds. From the results of this embodiment, it is understood that the self-grip system of the sample G exhibits the most excellent cutting characteristics as compared with other systems, as the connection system for the throw-away tipped drill to which this invention is applied.

TABLE 3

Figure 1:
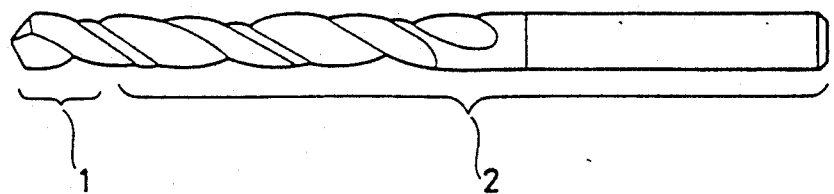
FIG. 1 is a diagram showing a conventional twist drill.

| | | Compared Characteristics | | | | | | |
|---|---|---|---|---|---|---|---|---|
| | | Cutting Balance (Horizontal Component) | | Thrust (N) | | Torque (J) | Hole Diameter Over Size (μm) | |
| | | Cutting Speed V (m/min.) | | | | | | |
| | Sample | 50 | 150 | 50 | 150 | 50 | 150 | Remarks |
| Invention | | | | | | | | |
| G | Self-Grip System | 190 | 180 | 1800 | 1850 | 3300 | 20 | Throw-Away Type shown in FIG. 1 |
| H | Two-Flute Screwed System | 1610 | 590 | 1980 | 2050 | 3800 | 200 | Throw-Away Type of FIGS. 5A to C |
| I | One-Flute Screwed System | 400 | unmeasurable | 7200 | unmeasurable | 4200 | 30 | Throw-Away Type shown in FIG. 6 Cutting Edge Departure at V = 150. |
| Comparative Sample J | Brazing Connection System with Cutting Edge of Cemented Carbide | 150 | unmeasurable | 2700 | unmeasurable | 6200 | 20 | Helical Flute, Cross Thinning, Number of Resharpenable Times: 5. Could not part chips and broken at V = 150 |

Note) Materials for insert portions and shank portions of the inventive samples G, H and I were prepared from those identical to the sample A in Table 1.

Third Embodiment

The same cemented carbide base material as the inventive sample B of the aforementioned first embodiment, i.e., cemented carbide having a hard phase of WC:(TiTa)(CN)=7:3 and 13 percent by volume of a binder phase was worked into a configuration for a drill of 10 mm in diameter, and coated with TiCN of 2 μm and Alzk$_2$o$_3$ of 2 μm, as well as TiN of 1 μm for the uppermost layer, as surface coating materials.

This drill was subjected to a performance evaluation test under the following conditions:

Workpiece: S50C ($H_B=220$)
Cutting Speed: 80 m/min., wet process (water-soluble cutting oil)
Feed: 0.18 mm/rev.
Depth: 20 mm As the result, it was possible to work 2000 holes (each length of cut: 40 mm), and the worn state was normal.

EMBODIMENT OF SIXTH INVENTION

An embodiment of the sixth invention is now described. Throw-away tipped drills in the embodiment of this invention are formed by employing silicon nitride sintered bodies for insert portions while employing steel for shank portions, and separably mechanically connecting both portions with each other in the system shown in FIG. 6.

The silicon nitride sintered bodies forming the insert portions in this embodiment are prepared by mixing various types of powder materials so that compositions reach numerals shown in Table 4 after sintering. As to the steel forming the shank portions, those of materials shown in Table 4 are employed. As to inventive samples and comparative samples in this embodiment, shown in Table 4, all of the insert portions and shank portions are connected with each other in the system shown in FIG. 6. Among the inventive samples A to C, the sample C, which is in the scope of this invention for the time being, is an example of such a case that the weight percentage of $Si_3N_4$ shown with ** is considerably less than a preferable value. The comparative sample D, whose insert portion is of a silicon nitride sintered body, is out of the inventive scope due to the fact that the material for the shank portion, shown with *, is not steel but P30-grade cemented carbide.

TABLE 5

| Sample | Number of Worked Hole | Amount of Outer Peripheral Front Flank Wear (mm) |
| --- | --- | --- |
| Inventive Sample | | |
| A | 3810 | 0.2 |
| B | 3250 | 0.2 |
| C | 1890 | 0.2 |
| Comparative Sample D | 2240 | Shank portion broken |
| Reference | | |
| E | 840 | 0.2 |
| F | 0 | Cutting edge remarkably worn |

Note)
E: Cutting edge of coated cemented carbide
F: Cutting edge of coated high-speed steel

EMBODIMENT OF SEVENTH INVENTION

An embodiment of the seventh invention is now described.

Throw-away tipped drills in this invention are formed by employing cermet alloys for insert portions while employing alloy steel materials for shank portions, and separably mechanically connecting the both portions with each other. The cermet alloys forming the

TABLE 4

| Sample | Insert Portion Starting Composition (wt. %) | Shank Portion |
| --- | --- | --- |
| Inventive Sample | | |
| A | $Si_3N_4$ (93.0), MgO (1.5), $Y_2O_3$ (4.5), $Al_2O_3$ (1.0) | SKH51 |
| B | SIALON (94.0), MgO (2.0), $Y_2O_3$ (2.0), $Al_2O_3$ (2.0) | SCM435 |
| C | **$Si_3N_4$ (78.0), MgO (10.0), $Y_2O_3$ (7.0) | SCM435 |
| Comparative Sample D | $\beta$-$Si_3N_4$ (93.0), MgO (2.5), $Y_2O_3$ (4.5), $Al_2O_3$ (5.0) | *P30-Grade Cemented Carbide |

Note 1) Starting composition indicates distribution ratio of powder in mixing.
Note 2) *shows that out of scope of this invention, and **shows deviation from preferable range of this invention.

Performance evaluation tests of drills were carried out using drills of 18 mm in diameter under the following conditions:

Workpiece: S50C ($H_B$=230)
Cutting Speed: 150 m/min., wet process (water-soluble cutting oil)
Feed: 0.10 mm/rev.
Depth: 15 mm
Criterion: Conditions of cutting edges etc. are observed after working up to end of life.
Life: Generally regarded as ended when the outer peripheral flank is worn in excess of 0.2 mm.

Results of the aforementioned drill performance evaluations tests are shown in Table 5. From these results, excellent results have been obtained regarding inventive samples A and B. As to the inventive sample C, the number of worked holes with respect to the same amount of wear is smaller than that compared to A and B, due to the fact that the weight percentage of $Si_3N_4$ in the silicon nitride sintered body forming the insert portion does not satisfy the condition of at least 80%, which is a preferable value, as shown in Table 4 with **. For the purpose of reference, similar experiments were also made using conventional drills having cutting edges of coated cemented carbide or coated high-speed steel (lower column of Table 5). Again, the results yielded by the present samples A to C are superior.

insert portions were prepared by mixing various powder materials so that compositions of hard dispersed phases, compositions of binder phases and grain size abundance ratios of the hard dispersed phases reached the numerical values shown in Table 6 after sintering. The alloy steel materials forming the shank portions were prepared from those of the materials shown in Table 6.

Figure 23:
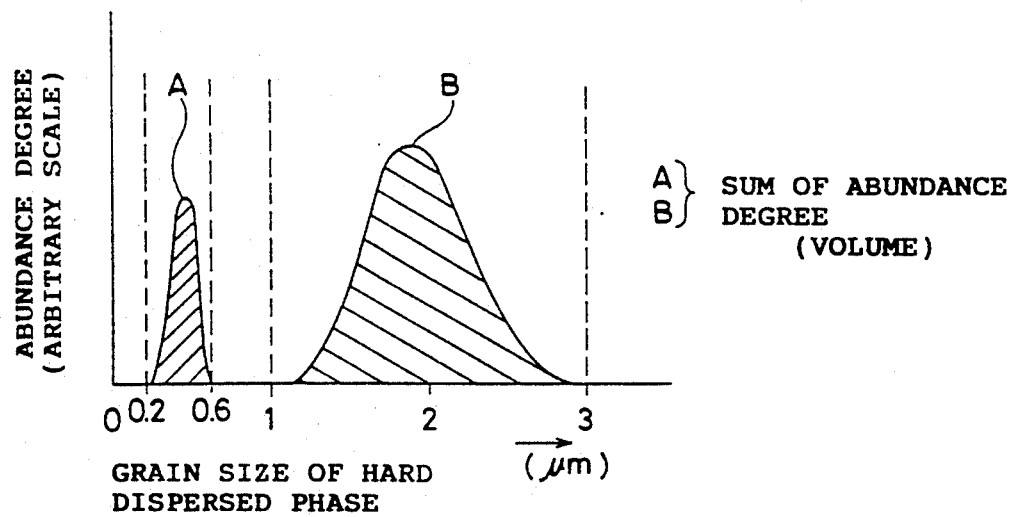
FIG. 23 is a distribution chart showing a particle size distribution of a hard dispersed phase of a cermet alloy of which inserts of the invention are made.

FIG. 23 shows grain size distribution of a hard dispersed phase in a cermet alloy forming the insert portion of a drill. Referring to this figure, symbol A represents abundance degree distribution of fine grains, and symbol B represents abundance degree distribution of coarse grains. The volume ratio of a fine grain group to a coarse grain group is shown in Table 6 as A/B.

Inventive samples and comparative samples shown in the following embodiment were prepared using drills of 16 mm diameter, utilizing the connection systems shown in FIGS. 6 to 8.

Table 6 shows compositions and grain size distributions etc. of hard alloys forming the inventive drills and drills prepared for the purpose of comparison. Referring to Table 6, the comparative sample F was prepared so that a nonmetal atom ratio and a grain size abundance ratio of the hard dispersed phase of the insert portion were out of the scope of this invention, as shown with *. The comparative sample G was prepared so that the amount of a metallic binder phase of the insert portion was out of the scope of this invention. As to the comparative sample H, K30-grade cemented carbide, which is out of the scope of this invention, was employed as the shank portion.

Numerals which are out of the scope of this invention are shown with * respectively.

inferior in shank strength, and the shank portion was broken.

Further, the samples C, D and E of the invention also had excellent performances substantially similar to those of the samples A and B of the invention, as shown in the tables.

The performance tests were made also with currently used coated high-speed steel or coated cemented carbide drills for the purpose of reference. In comparison of these drills with the drills of the invention samples A, B, C, D and E, it is obvious that performances of the drills of the inventive samples are superior.

TABLE 6

| | | Insert Portion | | | | | | | | |
|---|---|---|---|---|---|---|---|---|---|---|
| | | Hard Dispersed Phase | | | | | Amount of Binder Phase (wt. %) | | Grain Size Abundance Ratio of Hard Phase | |
| | | Component Ratio of Metal Atom | | | | Nonmetal Atomic Ratio | | | | |
| Classification | Sample | Ti | Ta | W | Mo | Nb | N/C + N | Ni | Co | A/B (*1) | Shank Portion (under JIS Standard) |
| Inventive Sample | A | 80 | 5 | 10 | 1 | 4 | 0.41 | 10 | 10 | 2.0 | SKD61 |
| | B | 88 | 5 | 7 | — | — | 0.38 | 7 | 15 | 1.0 | SCM435 |
| | C | 78 | 9 | 8 | 2 | 3 | 0.32 | 10 | 8 | 1.0 | SNCM439 |
| | D | 82 | 8 | 10 | — | — | 0.43 | 8 | 8 | 1.8 | SNC415 |
| | E | 75 | 5 | 15 | 2 | 3 | 0.48 | 11 | 8 | 2.5 | SUP7 |
| Comparative Sample | F | 80 | 5 | 10 | 1 | 4 | 0.05* | 10 | 10 | 0.2* | SKD61 |
| | G | 80 | 5 | 10 | 1 | 4 | 0.43 | 15* | 20* | 1.2 | SCM435 |
| | H | 88 | 5 | 7 | — | — | 0.47 | 11 | 8 | 1.8 | K30-Grade Cemented Carbide (WC-10 wt. % Co) |

(*1) Grain size abundance ratio of hard phase: A/B (volume ratio), (see FIG. 23)

Performance evaluation tests of drills were carried out under the following conditions:
Workpiece: S50C (H$_B$=220)
Cutting Speed: 120 m/min., wet process (water-soluble cutting oil)
Feed Rate: 0.15 mm/rev.
Depth: 35 mm
Criterion: Conditions of cutting edges etc. are observed after working up to end of life.
Life: Generally regarded as ended when the outer peripheral flank is worn in excess of 0.2 mm.

Results of the aforementioned drill performance evaluation tests are shown in Table 7. Referring to Table 7, first, the toughness of cermet forming the insert portion of comparative sample F was reduced compared with present samples A and B and the cutting edge portion of sample F chipped.

Next, it was recognized that the inner peripheral face adhesive wear depth was deep in the comparative sample G. Comparative sample G was also inferior in adhesion resistance in comparison to present samples A and B.

In comparing the inventive samples A and B with the comparative sample H, the comparative sample H was

TABLE 7

| Classification | Sample | Number of Drilling | Amount of Outer Peripheral Front Flank Wear | Depth of Inner Peripheral Face Adhesive Wear |
|---|---|---|---|---|
| Inventive Sample | A | 2100 holes | 0.2 | 0.01 |
| | B | 1989 holes | 0.2 | 0.02 |
| | C | 1970 holes | 0.2 | 0.01 |
| | D | 2050 holes | 0.2 | 0.02 |
| | E | 1959 holes | 0.2 | 0.02 |
| Comparative Sample | F | 710 holes | Test stopped by cutting edge chip | |
| | G | 385 holes | 0.2 | 0.12 |
| | H | 625 holes | Test stopped by breakage of shank portion | |
| Reference | Coated High-Speed Steel | 124 holes | Test stopped by cutting edge chip | |
| | Coated Cemented Carbide (Single Material) | 1005 holes | Test stopped by breakage of shank portion | |
| | Coated Cemented Carbide (Cutting Edge Alone Brazed) | 989 holes | Test stopped by cutting edge chipping | |

INDUSTRIAL APPLICABILITY

According to the first invention to the fourth invention, as hereinabove described, the insert portion and the shank portion are connected with or fixed to each other without separate fastening means such as screwing. Therefore, it is possible to manufacture a small-diameter throw-away tipped drill of not more than 10 mm in diameter, which has not been implemented by the conventional system of fixing an insert portion to a shank portion by screwing or the like. Workability is improved in a step of connecting the insert portion and the shank portion to each other, by simply performing press fitting, without requiring an operation such as screwing.

According to the fifth, sixth and seventh invention, a material which is excellent in wear resistance, adhesion resistance or thermal cracking resistance (chipping resistance) is employed as a material for the insert portion of the throw-away tipped drill while a material which is excellent in toughness and is of relatively low cost is employed for the shank portion and both portions are mechanically connected with each other, thereby forming a drill. Thus, a throw-away tipped drill having high reliability, high life and high quality, which displays no abrupt breakage or the like, is provided at a relatively low cost.

We claim:

1. A throw-away tipped drill comprising a shank (32) of alloy steel for attaching said drill to a drive shaft, a throw-away insert (31) for cutting a work piece, and means for separably and mechanically connect said insert to said shank, and wherein said insert is formed of cermet made of a hard dispersed phase composition mainly composed of a member selected from the group consisting of titanium and carbides, nitrides and double carbo-nitrides of at least one metal belonging to groups IVa, Va and VIa of the periodic table excluding titanium; and a metallic binder phase mainly composed of nickel and cobalt, wherein said hard dispersed phase composition is expressed as $(Ti_aM_b)(C_cN_d)$, wherein M represents at least one metal belonging to groups IVa, Va and VIa of the periodic table, excluding Ti, a, b, c and d represent molar fractions, $a+b=1$, $c+d=1$, $0.5 \leq a \leq 0.95$ and $0.1 \leq d \leq 0.7$, wherein said hard dispersed phase composition comprises at least one fine grain group whose mean particle diameter is at least 0.2 $\mu$m and not more than 0.7 $\mu$m and a coarse grain group whose mean particle diameter is at least 1 $\mu$m and not more than 3 $\mu$m, and the volume ratio of said fine grain group to said coarse grain group is at least 0.3 and not more than 3, and wherein said metallic binder phase contained in said cermet is at least 5 percent by weight and not more than 30 percent by weight.

2. A throw-away tipped drill comprising a shank for connecting said drill to a drive shaft, a throw-away insert for cutting a work piece, and means for removably securing said insert to said shank, said securing means comprising as part of said insert a pair of approximately parallel insert main surfaces and a pair of insert side surfaces, said securing means further comprising as part of said shank first shank sections having inner walls abutting said pair of insert main surfaces, and second shank sections having inner walls abutting said pair of insert side surfaces respectively, said securing means further comprising at least one slit (34, 39) formed in at least one of said insert and said shank, whereby said inner walls of said second shank sections abutting said pair of insert side surfaces hold said pair of insert side surfaces by an elastic force generated by a relative movement of opposite surfaces forming said slit, said elastic force acting in a direction approximately parallel to said pair of insert main surfaces, wherein said slit is too narrow to receive said insert.

3. The throw-away tipped drill of claim 2, wherein said slit (34) is formed between one of said first shank sections and one of said second shank section.

4. The throw-away tipped drill of claim 2, wherein said slit (39) is formed in said insert substantially in parallel with said pair of insert side surfaces.

5. The throw-away tipped drill of claim 2, wherein at least one of said pair of insert side surfaces and said inner shank walls abutting said pair of insert side surfaces is tapered to form a taper, and wherein an angle of said taper is so formed that said insert side surfaces and said inner shank walls abutting said side surfaces come into a press-fitted surface contact with each other when said insert is held by said shank.

6. The throw-away tipped drill of claim 5, wherein said slit (34) is formed between one of said first shank sections and one of said second shank sections, so that opposite surfaces of said slit mutually move in parallel to each other when said insert is held by said shank, whereby said shank sections are so elastically deformed that an angle formed by said insert side surfaces coincides with an angle formed by said inner surfaces of said shank sections abutting said insert side surfaces.

7. A throw-away tipped drill comprising an insert (31) for cutting a work piece, a shank (32), means for separably mechanically securing said insert to said shank, said insert securing means comprising a held insert section (31a) formed as part of said insert and having two wide sides in parallel to each other and two narrow sides also in parallel to each other, said securing means further comprising holding sections (33a, 33b) formed as part of said shank (32) for holding said insert section by engaging said narrow surfaces of said held section (31a), at least said narrow held surfaces of said held section (31a) and at least respective opposite holding surfaces of said holding sections (33a, 33b) having a taper with a tapering angle so formed that said holding surfaces and said held surfaces engage each other with a press-fit when said insert (31) is held by said shank (32), and wherein a slit (39) is formed in said held section (32) of said insert (31), so that opposite surfaces of said slit (39) mutually move relative to each other when said insert (31) is held by said shank (32), whereby said held insert section is so elastically deformed that said tapering angle formed by said held narrow surfaces coincides with a tapering angle formed by said holding surfaces of said shank (32).

8. A shank for holding a throw-away drill tip insert in a separable manner without screws, said shank comprising insert holding means including first shank sections having inner walls for abutting a pair of main surfaces of said insert, and second shank sections having inner walls for abutting a pair of side surfaces of said insert, said shank further comprising at least one slit between one of said first shank sections and one of said second shank sections, said slit being so positioned that said pair of side surfaces of said insert are held by an elastic force generated as a result of a relative movement of a pair of opposite surfaces forming said slit, said elastic force acting in a direction approximately parallel to said pair of main surfaces of said insert.

9. The shank of claim 8, wherein said slit is so formed that only one of said inner walls of said second shank sections abutting said side surfaces of said insert is elastically deformed by mutual movement of opposite surfaces of said slit.

10. The shank of claim 8 wherein said slit is so formed that both of said inner walls of said second shank sections abutting said side surfaces of said insert, are elastically deformed by mutual movement of opposite surfaces of said slit.

11. The shank of claim 8, wherein each of said inner walls of said second shank sections abutting said side surfaces of said insert has a taper.

12. An insert tip for a throw-away tipped drill, separably mechanically connectable to a shank, comprising a tip body having a tip section and held section, said held section comprising a pair of approximately parallel main surfaces, a pair of side surfaces, and a slit formed in said held section, said slit extending substantially in parallel with said pair of side surfaces, and wherein said pair of side surfaces engages said shank with an elastic force caused by an elastic deformation of a pair of opposite slit surfaces facing each other when said insert is attached to said shank.

13. The insert tip of claim 12, wherein each side surface of said pair of side surfaces of said held section has a taper.

14. The insert tip of claim 12, wherein each side surface of said pair of side surfaces of said held section has two tapers ($\theta_1$ and $\theta_8$).

15. A throw-away tipped drill comprising an insert (31) for cutting a work piece, a shank, and means for removably securing said insert to said shank without screws, wherein said insert (31) is made of cemented carbide and includes a surface coating, and said shank (32) is made of steel, wherein said surface coating is selected from the group consisting of $Al_2O_3$, carbides, nitrides, borides, carbonitrides, carbo-oxides, carbo-oxy-nitrides and boronitrides of metals belonging to groups IVa, Va and VIa of the periodic table, and wherein said cemented carbide of said insert (31) is formed by a hard phase of a B1 type solid solution composed of WC and at least one member selected from the group consisting of carbides, nitrides and carbonitrides of metals belonging to groups IVa, Va and VIa of the periodic table and a binder phase of an iron family metal, said binder phase being present within the range of 5 to 30 percent by volume.

16. The throw-away tipped drill of claim 15, wherein said coating on said insert comprises at least two layers.

17. The throw-away tipped drill of claim 15, wherein said iron family metal is Co present in said hard phase within the range of 5 to 30 percent by volume.

18. A throw-away tipped drill comprising an insert (31) for cutting a work piece, a shank, and means for removably securing said insert to said shank without screws, wherein said insert (31) is made of a silicon nitride sintered body, and said shank (32) is made of steel, and wherein said sintered silicon nitride body comprises a binder phase selected from the group consisting of $Si_3N_4$ and SIALON $Si_{6\ to\ z} Al_z N_{8-a}$, wherein $z=0$ to 4.2, said binder phase occupying at least 80 percent by weight of said silicon nitride sintered body.

* * * * *